(12) United States Patent
Wang et al.

(10) Patent No.: US 12,555,230 B2
(45) Date of Patent: Feb. 17, 2026

(54) REGRESSION-BASED APPROACH FOR MEASUREMENT OF ROTATOR CUFF TEARS IN SHOULDER MRI IMAGES

(71) Applicant: Siemens Healthineers AG, Forchheim (DE)

(72) Inventors: Jianing Wang, Plainsboro, NJ (US); Michael Schwier, Hamburg (DE); Bernhard Geiger, Cranbury, NJ (US); Sasa Grbic, Plainsboro, NJ (US)

(73) Assignee: Siemens Healthineers AG, Forchheim (DE)

( * ) Notice: Subject to any disclaimer, the term of this patent is extended or adjusted under 35 U.S.C. 154(b) by 408 days.

(21) Appl. No.: 18/191,108

(22) Filed: Mar. 28, 2023

(65) Prior Publication Data

US 2024/0331138 A1 Oct. 3, 2024

(51) Int. Cl.
*G06T 7/00* (2017.01)
*A61B 5/00* (2006.01)
*G06T 7/60* (2017.01)
*G06T 7/73* (2017.01)

(52) U.S. Cl.
CPC .......... *G06T 7/0012* (2013.01); *A61B 5/4576* (2013.01); *G06T 7/60* (2013.01); *G06T 7/73* (2017.01); *G06T 2207/10088* (2013.01); *G06T 2207/20076* (2013.01); *G06T 2207/20081* (2013.01); *G06T 2207/20084* (2013.01)

(58) Field of Classification Search
CPC ........... G06T 7/0012; G06T 7/60; G06T 7/73; G06T 2207/10088; G06T 2207/20076; G06T 2207/20081; G06T 2207/20084; A61B 5/4576
See application file for complete search history.

(56) References Cited

U.S. PATENT DOCUMENTS

| | | | |
|---|---|---|---|
| 11,386,553 B2 | 7/2022 | Park et al. | |
| 2009/0076371 A1* | 3/2009 | Lang | A61B 5/055 600/407 |
| 2020/0167911 A1* | 5/2020 | Park | G06T 7/11 |
| 2022/0392614 A1 | 12/2022 | Schwier et al. | |

(Continued)

OTHER PUBLICATIONS

Lu et al. "Predicting Rotator Cuff Tears Using Data Mining and Bayesian Likelihood Ratios", Apr. 2014, vol. 9, Issue 4, PLOS One, pp. 1-8. (Year: 2014).*

(Continued)

*Primary Examiner* — Siamak Harandi

(57) ABSTRACT

Systems and methods for calculating a distance between a first point and a second point of an anatomical landmark are provided. An input medical image of an anatomical landmark of a patient is received. One or more probability maps predicting a first point and a second point of the anatomical landmark in the input medical image are generated using a machine learning based model. Locations of the first point and the second point in the input medical image are determined based on the one or more probability maps. A distance between the first point and the second point is calculated based on the locations. The locations of the first point and the second point in the input medical image and/or the calculated distance between the first point and the second point are output.

20 Claims, 7 Drawing Sheets

(56) References Cited

U.S. PATENT DOCUMENTS

2023/0298174 A1* 9/2023 Otomaru .................. G06F 3/14
                                                            382/128

OTHER PUBLICATIONS

Athwal et al., "Rotator Cuff Tears", Amerian Academy of Orthopaedic Surgeons, OrthoInfo retrieved at https://orthoinfo.aaos.org/en/diseases-conditions/rotator-cuff-tears, 2022, 9 pgs.

Okoroha et al., "Characterization of rotator cuff tears: ultrasound versus magnetic resonance imaging", Orthopedics, 2017, pp. e124-e130.

Yang et al., "Automatic liver segmentation using an adversarial image-to-image network", International Conference on Medical Image Computing and Computer-Assisted Intervention, arXiv:1707.08037v1, 2017, 8 pgs.

Nibali et al., "Numerical coordinate regression with convolutional neural networks", arXiv preprint arXiv:1801.07372, 2018, pp. 1-10.

Cicek et al., "3D U-Net: Learning Dense Volumetric Segmentation from Sparse Annotation", arXiv:1606.06650v1, 2016, 1-8 pgs.

Isola et al., "Image-to-Image Translation with Conditional Adversarial Networks", arXiv:1611.07004v3, 2018, 17 pgs.

Long et al., "Fully Convolutional Networks for Semantic Segmentation", arXiv:1411.4038v2, 2015, 10 pgs.

* cited by examiner

REGRESSION-BASED APPROACH FOR MEASUREMENT OF ROTATOR CUFF TEARS IN SHOULDER MRI IMAGES

TECHNICAL FIELD

The present invention relates generally to artificial intelligence and machine learning for medical imaging analysis, and in particular to a regression-based approach for measurement of rotator cuff tears in shoulder MRI (magnetic resonance imaging) images.

BACKGROUND

The rotator cuff is a group of muscles and tendons that surround the shoulder joint. Rotator cuff tears occur when the tendons pull away from the humerus bone and are one of the most common causes of shoulder pain. MRI (magnetic resonance imaging) imaging is currently considered to be the standard of care for the diagnosis, assessment, and treatment planning of rotator cuff tears. In the current clinical practice, radiologists manually interpret the MRI imaging to determine the length of rotator cuff tears, which is an important factor in assessing patient prognosis and surgical outcomes. However, such manual interpretation of MRI imaging is a time consuming and tedious task and subject to variability amongst radiologists.

Recently, a deep learning approach has been proposed for automatic measurement of full-thickness supraspinatus tendon tears. In the proposed approach, the area of the tear is first segmented and measurements of the tear are then extracted from the segmentation. However, this two-step segmentation-based proposed approach may be computationally expensive and have relatively low robustness.

BRIEF SUMMARY OF THE INVENTION

In accordance with one or more embodiments, systems and methods for calculating a distance between a first point and a second point of an anatomical landmark are provided. An input medical image of an anatomical landmark of a patient is received. One or more probability maps predicting a first point and a second point of the anatomical landmark in the input medical image are generated using a machine learning based model. Locations of the first point and the second point in the input medical image are determined based on the one or more probability maps. A distance between the first point and the second point is calculated based on the locations. The locations of the first point and the second point in the input medical image and/or the calculated distance between the first point and the second point are output.

In one embodiment, the locations of the first point and the second point in the input medical image are determined using a DSNT (differentiable spatial to numerical transform) layer based on a size of the input medical image. The machine learning based model and the DSNT layer are jointly trained based on a training data set comprising ground-truth locations of first points and second points in training images, ground-truth probability maps of the first points and the second points in the training images, and ground-truth vectors pointing from the first points and the second points in the training images. The machine learning based model may be an image-to-image based DNN (deep neural network).

In one embodiment, 3D (three-dimensional) coordinates of the first point and the second point in the input medical image are determined.

In one embodiment, the anatomical landmark is a tear in a muscle or tendon of the patient and the first point and the second point are end points of the tear. The tear in the muscle or tendon of the patient may be a tear in a rotator cuff of the patient.

These and other advantages of the invention will be apparent to those of ordinary skill in the art by reference to the following detailed description and the accompanying drawings.

DETAILED DESCRIPTION

The present invention generally relates to methods and systems for a regression-based approach for measurement of rotator cuff tears in shoulder MRI (magnetic resonance imaging) images. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments described herein provide for a regression-based approach for the automatic measurement of a rotator cuff tear in MRI images. The regression-based approach predicts the locations of endpoints of the rotator cuff tear, such that the length of the rotator cuff tear can be obtained by calculating a distance between the locations of the endpoints. Advantageously, the regression-based approach in accordance with embodiments described herein can calculate the length of the rotator cuff tear directly, which is a more efficient and robust approach as compared to the conventional two-step segmentation-based approach.

Figure 1:
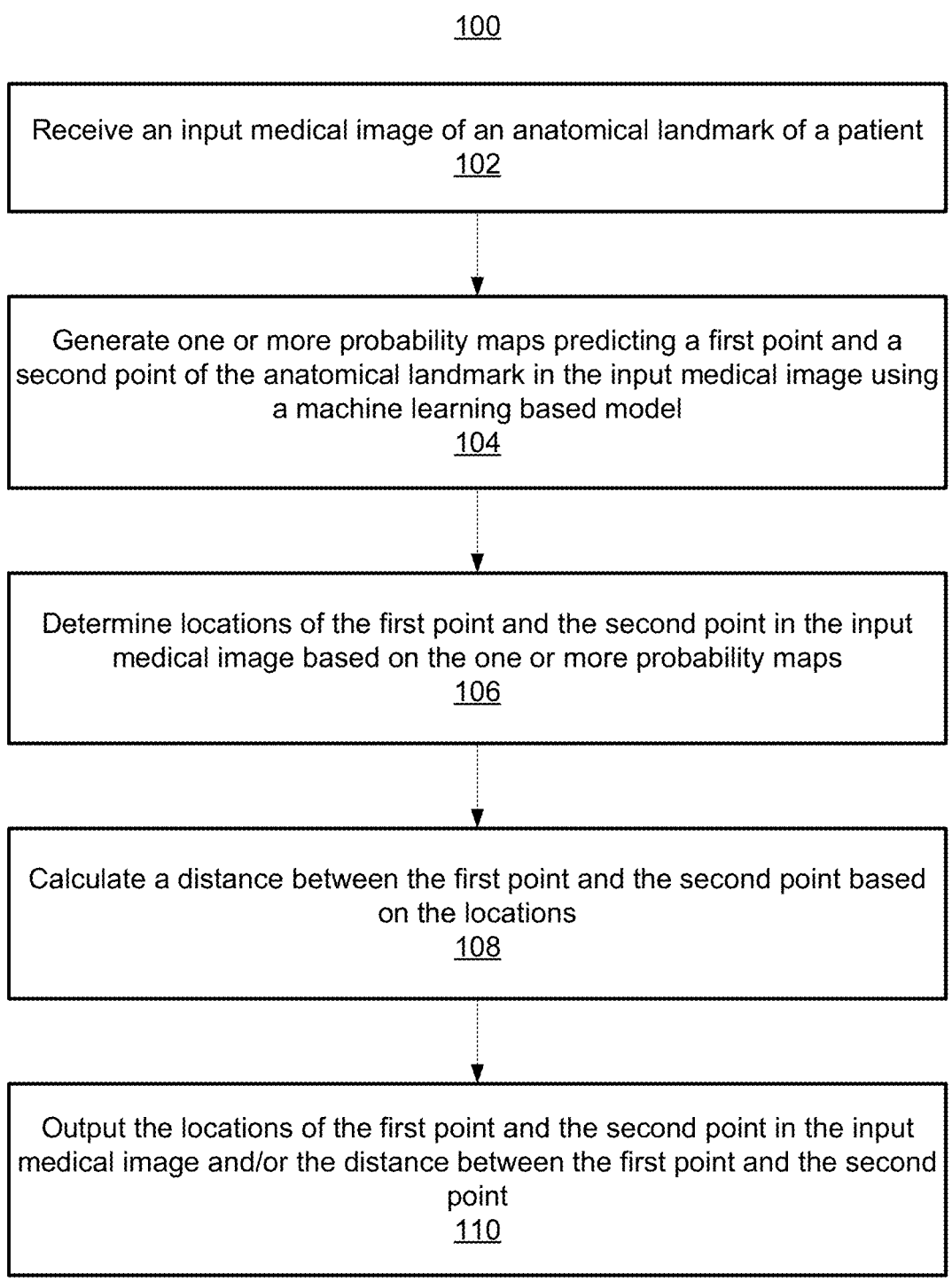
FIG. 1 shows a method for calculating a distance between a first point and a second point of an anatomical landmark, in accordance with one or more embodiments.
Figure 2:
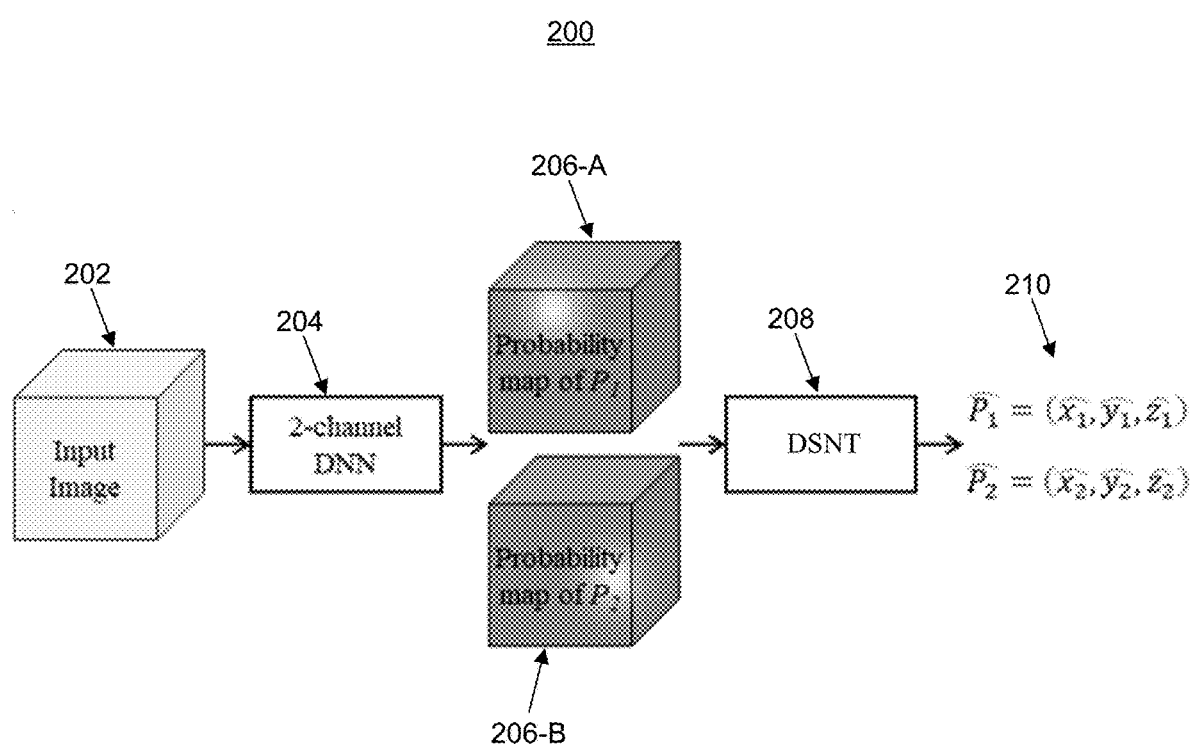
FIG. 2 shows a workflow for calculating a distance between a first point and a second point of an anatomical landmark, in accordance with one or more embodiments.

FIG. 1 shows a method 100 for calculating a distance between a first point and a second point of an anatomical landmark, in accordance with one or more embodiments. The steps of method 100 may be performed by one or more suitable computing devices, such as, e.g., computer 702 of FIG. 7. FIG. 2 shows a workflow 200 for calculating a distance between a first point and a second point of an anatomical landmark, in accordance with one or more embodiments. FIG. 1 and FIG. 2 will be described together.

At step 102 of FIG. 1, an input medical image of an anatomical landmark of a patient is received. In one example, as shown in workflow 200 of FIG. 2, the input medical image is input image 202. In one embodiment, the anatomical landmark is a tear in a muscle and/or tendon of the patient, such as, e.g., in a rotator cuff of the patient. However, the anatomical landmark may be an organ, bone, vessel, lesion, or any other anatomically meaningful point(s), object, or pattern of interest of the patient.

In one embodiment, the input medical image is a 3D (three-dimensional) MRI image of the rotator cuff of the patient represented as a plurality of 2D (two-dimensional) slices. However, the input medical image may be of any other suitable modality, such as, e.g., CT (computed tomography), US (ultrasound), x-ray, or any other medical imaging modality or combinations of medical imaging modalities. The input medical image may be a 2D image and/or a 3D volume, and may comprise a single input medical image or a plurality of input medical images. Accordingly, reference herein to pixels of a 2D image equally refer to voxels of a 3D volume and vice versa. The input medical image may be received directly from an image acquisition device, such as, e.g., an MRI scanner, as the medical image is acquired, can be received by loading a previously acquired medical image from a storage or memory of a computer system, or can be received from a remote computer system.

At step 104 of FIG. 1, one or more probability maps predicting a first point and a second point of the anatomical landmark in the input medical image are generated using a machine learning based model. In one embodiment, the first point and the second point of the anatomical landmark respectively comprises a first end point and a second end point of the tear of the rotator cuff of the patient. However, the first point and the second point of the anatomical landmark may represent any other points of interest on the anatomical landmark.

The one or more probability maps may comprise a first probability map predicting the first point in the input medical image and a probability map predicting the second point in the input medical image. The one or more probability maps may define, for each respective pixel, a probability that the respective pixel depicts the first point or the second point in a corresponding pixel of the input medical image. For example, each respective pixel of the probability maps may have an intensity value ranging from, e.g., 0 to 1 to indicate the probability.

In one example, as shown in workflow 200 of FIG. 2, the one or more probability maps comprise probability map 206-A predicting first end point $P_1$ of the tear of the rotator cuff in input image 202 and probability map 206-B predicting second end point $P_2$ of the tear of the rotator cuff in input image 202. Probability maps 206-A and 206-B are collectively referred to herein as probability maps 206. Probability maps 206 are generated by 2-channel DNN (deep neural network) 204.

In one embodiment, the machine learning based model is a DNN (deep neural network). For example, as shown in workflow 200 of FIG. 2, machine learning based model may be 2-channel DNN 204. DNN 204 receives input image 202 as input and generates probability map 206-A in a first channel and probability map 206-B in a second channel as output. DNN 204 may be implemented as an image-to-image based DNN, such as, e.g., DI2IN (deep image-to-image network), 3D U-Net, Pix2Pix, FCN (fully convolutional network), etc. However, the machine learning based model may be implemented according to any other suitable machine learning based architecture.

At step 106 of FIG. 1, locations of the first point and the second point in the input medical image are determined based on the one or more probability maps. In one embodiment, the locations of the first point and the second point are coordinates (e.g., 3D coordinates) of the first point and the second point in the input medical image.

In one embodiment, the locations of the first point and the second point in the input medical image are determined using a DSNT (differentiable spatial to numerical transform) layer. For example, as shown in workflow 200 of FIG. 2, DSNT layer 208 converts probability maps 206 to locations 210 of the first point and the second point in the input image 202. Locations 210 comprise predicted 3D coordinates $\widehat{P}_1 = (\widehat{x}_1, \widehat{y}_1, \widehat{Z}_1)$ of the first point $P_1$ and predicted 3D coordinates $\widehat{P}_2 = (\widehat{x}_2, \widehat{y}_2, \widehat{Z}_2)$ of the second point $P_2$. In one embodiment, locations 210 may be determined according to workflow 300 of FIG. 3, described in detail below. However, the locations of the first point and the second point in the input medical image may be determined using any other suitable approach, such as, e.g., by computing the argmax of pixel values, applying a fully connected layer, etc.

Figure 3:
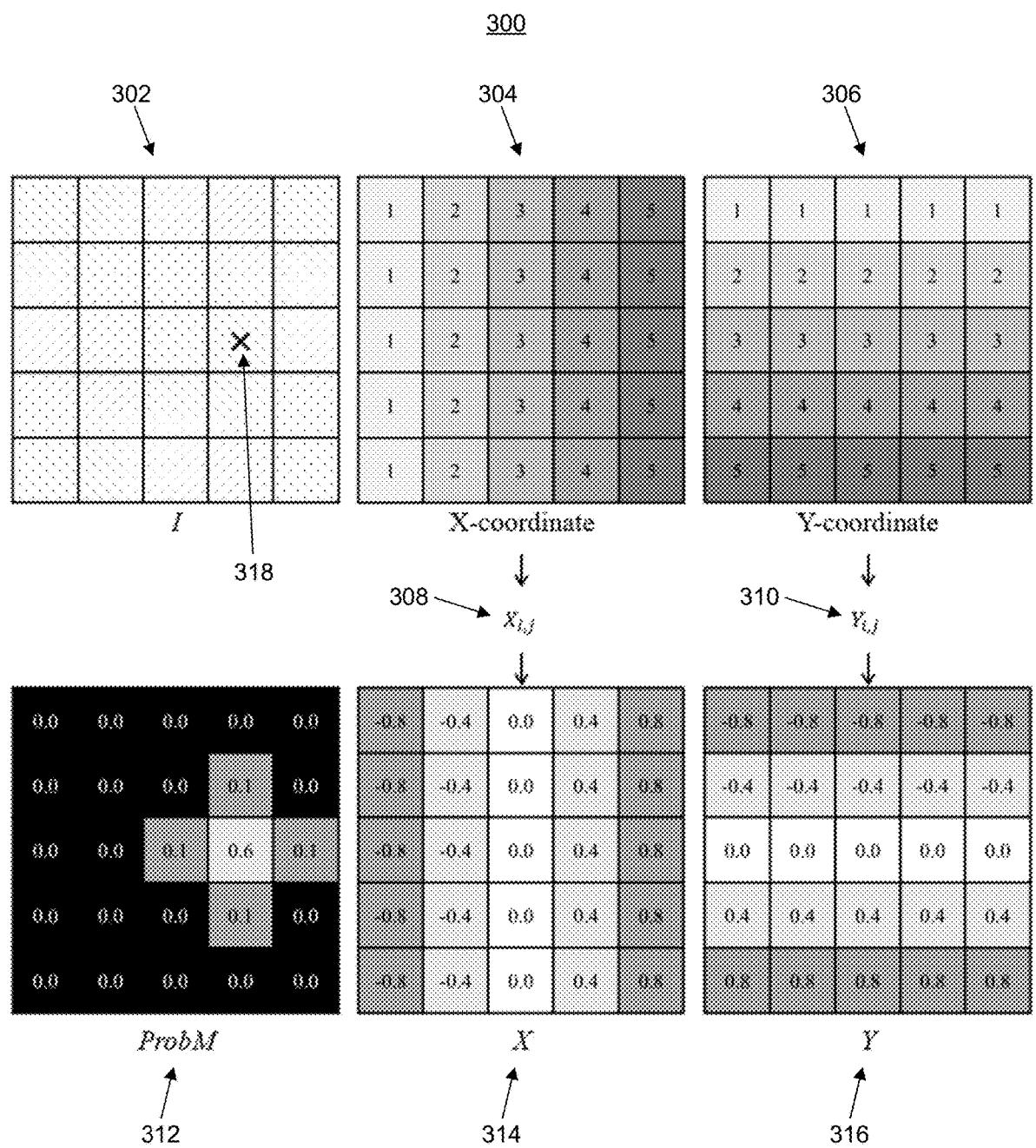
FIG. 3 shows a workflow for determining coordinates of an anatomical landmark of interest based on a probability map using a DSNT (differentiable spatial to numerical transform) layer, in accordance with one or more embodiments.

FIG. 3 shows a workflow 300 for determining coordinates of an anatomical landmark of interest based on a probability map using a DSNT layer, in accordance with one or more embodiments. The DSNT layer has no trainable parameters, is fully differentiable, and generalizes spatially. In workflow 300, an image I 302 and a probability map ProbM 312 of a location of the anatomical landmark of interest in image I 302 are received. Image I 302 is a 2D image of size m×n pixels. As an example, it is assumed that m is 5, n is 5, and the anatomical landmark of interest is at location 318 where the X-coordinate is 4 and the Y-coordinate is 3 in image I 302. Image I 302 may be represented as an X-coordinate representation 304 and a Y-coordinate representation 306.

To determine the coordinates of the anatomical landmark of interest, matrix X 314 and matrix Y 316 of size m×n are generated from X-coordinate representation 304 and Y-coordinate representation 306 respectively. Matrix X 314 and matrix Y 316 are generated by respectively calculating $X_{i,j}$ 308 and $Y_{i,j}$ 310 as follows:

$$X_{i,j} = \frac{2j - (n+1)}{n} \quad (1)$$

$$Y_{i,j} = \frac{2i - (m+1)}{m} \quad (2)$$

Each entry of matrix X 314 and matrix Y 316 has its own X- or Y-coordinate respectively, scaled such that, e.g., the top-left corner of the image is located at coordinate (−1,−1) and the bottom-right corner of the image is located at coordinate (1,1).

Probability map ProbM 312 is the probability map of the location of the anatomical landmark of interest. The size of probability map ProbM 312 is m×n and all elements of probability map ProbM 312 are non-negative and sum to one.

The Frobenius inner product is denoted as $\langle \bullet, \bullet \rangle_F$, which is equivalent to taking the scalar dot product of vectorized matrices. The scaled coordinates [x', y'] can be calculated as follows:

$$[x', y'] = [\langle ProbM, X \rangle_F, \langle ProbM, Y \rangle_F] \quad (3)$$

And the coordinates [x, y] in image I 302 can be calculated as follows:

$$[x, y] = \left[ \frac{x' \times n + (n+1)}{2}, \frac{y' \times m + (m+1)}{2} \right] \quad (4)$$

Thus, given probability map ProbM 312 and the size of image I 302, the coordinates [x, y] can be calculated using the DSNT layer as follows:

$$[x, y] = DSNT(ProbM, m, n) \quad (5)$$

In the example described above, [x, y]=[4,3].

At step 108 of FIG. 1, a distance between the first point and the second point is calculated based on the locations. For example, the distance may be calculated as a Euclidean distance between the location of the first point and the location of the second point. However, the distance may be calculated as any other suitable distance. In the embodiment where the first point and the second point are end points of a tear of the rotator cuff, the distance represents the length of the tear.

At step 110 of FIG. 1, the locations of the first point and the second point in the input medical image and/or the distance between the first point and the second point are output. For example, the locations and/or the distance can be output by displaying the locations and/or the distance on a display device of a computer system, storing the locations and/or the distance on a memory or storage of a computer system, or by transmitting the locations and/or the distance to a remote computer system.

The machine learning based model (utilized at step 104 of FIG. 1) and the DSNT layer (utilized at step 106 of FIG. 1) are jointly trained during a prior offline training stage using a training data set. The training data set may comprise ground-truth locations (e.g., coordinates) of a first point and a second point in training images, ground-truth probability maps of the first point and the second point in the training images, and ground-truth vectors pointing from the first point and the second point in the training images. Once trained, the trained machine learning based model and the DSNT layer are applied during an online inference stage, e.g., to respectively perform steps 104 and 106 of FIG. 1.

In one embodiment, the loss function for jointly training the machine learning based model and the DSNT layer is defined in Equation (6). The loss function of Equation (6) is defined as the weighted sum of the MSE (mean squared error) between the predicted and ground-truth probability maps, the MSE between the predicted and the ground-truth locations, and the CosSim (cosine similarity) between the predicted and the ground-truth vectors pointing from the first point and the second point. Equation (6) is defined as follows:

$$\mathcal{L} = \alpha(MSE(\widehat{ProbM_1}, ProbM_1) + MSE(\widehat{ProbM_2}, ProbM_2)) + \quad (6)$$
$$\beta(MSE(\hat{P}_1, P_1) + MSE(\hat{P}_2, P_2)) \gamma CosSim(\widehat{\hat{P}_1 \hat{P}_2}, \overrightarrow{P_1 P_2}) + \delta MSE(\hat{Z}_1, \hat{Z}_2)$$

where $\widehat{ProbM_i}$ and $ProbM_i$ are respectively the predicted and the ground-truth probability maps of the i-th point, $\hat{P}_i$ and $P_i$ are respectively the predicted and the ground-truth coordinates of the i-th point, i is {1,2}, and $\alpha$, $\beta$, $\gamma$, and $\delta$ are weights of each term. Because the first point $P_1$ and the second point $P_2$ were drawn on the same slice of the MRI sequence of the training images, the term $MSE(\hat{Z}_1, \hat{Z}_2)$ is used to penalize the difference between the Z coordinates of the two predicted points. $ProbM_i$ may be generated by scaling a Gaussian density map centered at $P_i$ to sum to 1.

Figure 4:
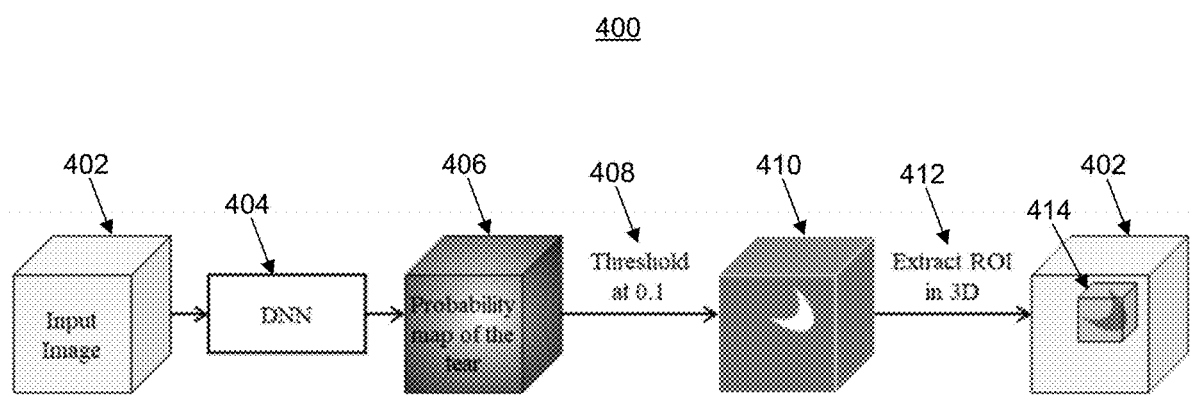
FIG. 4 shows a workflow for extracting a patch from a medical image, in accordance with one or more embodiments.

In one embodiment, the input medical image (received at step 102 of FIG. 1) is a 3D patch of a relatively smaller region of interest around the anatomical landmark extracted from a relatively larger 3D medical image. FIG. 4 shows a workflow 400 for extracting a patch from a medical image, in accordance with one or more embodiments. In workflow 400, input image 402 is a 3D MRI image of a tear of a rotator cuff of a patient. However, input image 402 may be of any other suitable modality. The tear is segmented from input image 402 by DNN segmentation network 404 to generate a probability map 406 of the tear. DNN segmentation network 404 is a multi-layer convolutional neural network, which takes input image 402 as input and outputs probability map 406 that indicates a probability of voxels of input image 402 of depicting the tear. A threshold 408 is applied to the probabilities of probability map 406 to generate a binary segmentation map 410 of the tear. As shown in FIG. 4, threshold 408 illustratively defined to be 0.1 but may be any other suitable value. A patch 414 of a relatively smaller region of interest around the tear is extracted 412 by cropping input image 402 using binary segmentation map 410. Patch 414 may be of a fixed, predetermined size. In one embodiment, patch 414 is the input medical image received at step 102 of FIG. 1. By utilizing a relatively smaller patch 414 in method 100 of FIG. 1, the first point and the second points are identified (at step 104 of FIG. 1) within the smaller region of interest, which may lead to more refined predictions.

In one embodiment, the anatomical landmark is a tumor and the first point and the second point are points on opposite sides of the tumor. Accordingly, method 100 of FIG. 1 may be performed to calculate a diameter of the tumor. Other anatomical landmarks and other applications of method 100 of FIG. 1 are also contemplated.

Advantageously, embodiments described herein are trained on coordinates of the first point and the second point and can thus generate the distance between the first point and the second point directly, which is more efficient as compared to conventional approaches. Further, embodiments described herein may be more robust as compared to conventional approaches.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based models, as well as with respect to methods and systems for training machine learning based models. Features, advantages or alternative embodiments herein can be assigned to the other claimed objects and vice versa. In other words, claims for methods and systems for training a machine learning based model can be improved with features described or claimed in context of the methods and systems for utilizing a trained machine learning based model, and vice versa.

In particular, the trained machine learning based models applied in embodiments described herein can be adapted by the methods and systems for training the machine learning based models. Furthermore, the input data of the trained machine learning based model can comprise advantageous features and embodiments of the training input data, and vice versa. Furthermore, the output data of the trained machine learning based model can comprise advantageous features and embodiments of the output training data, and vice versa.

In general, a trained machine learning based model mimics cognitive functions that humans associate with other human minds. In particular, by training based on training data, the trained machine learning based model is able to adapt to new circumstances and to detect and extrapolate patterns.

In general, parameters of a machine learning based model can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based model can be adapted iteratively by several steps of training.

In particular, a trained machine learning based model can comprise a neural network, a support vector machine, a decision tree, and/or a Bayesian network, and/or the trained machine learning based model can be based on k-means clustering, Q-learning, genetic algorithms, and/or association rules. In particular, a neural network can be a deep neural network, a convolutional neural network, or a convolutional deep neural network Furthermore, a neural network can be an adversarial network, a deep adversarial network and/or a generative adversarial network.

In one embodiment, the trained machine learning based model utilized in accordance with embodiments described herein can comprise a DNN. In particular, a DNN can be a convolutional neural network or a transformer neural network. Furthermore, a DNN can be an adversarial network, a generative adversarial network, an autoencoder, or a variational autoencoder. In particular, examples of deep neural networks include DI2IN, 3D U-Net, Pix2Pix (image-to-image translation with conditional adversarial networks), FCN, and so on.

Figure 5:
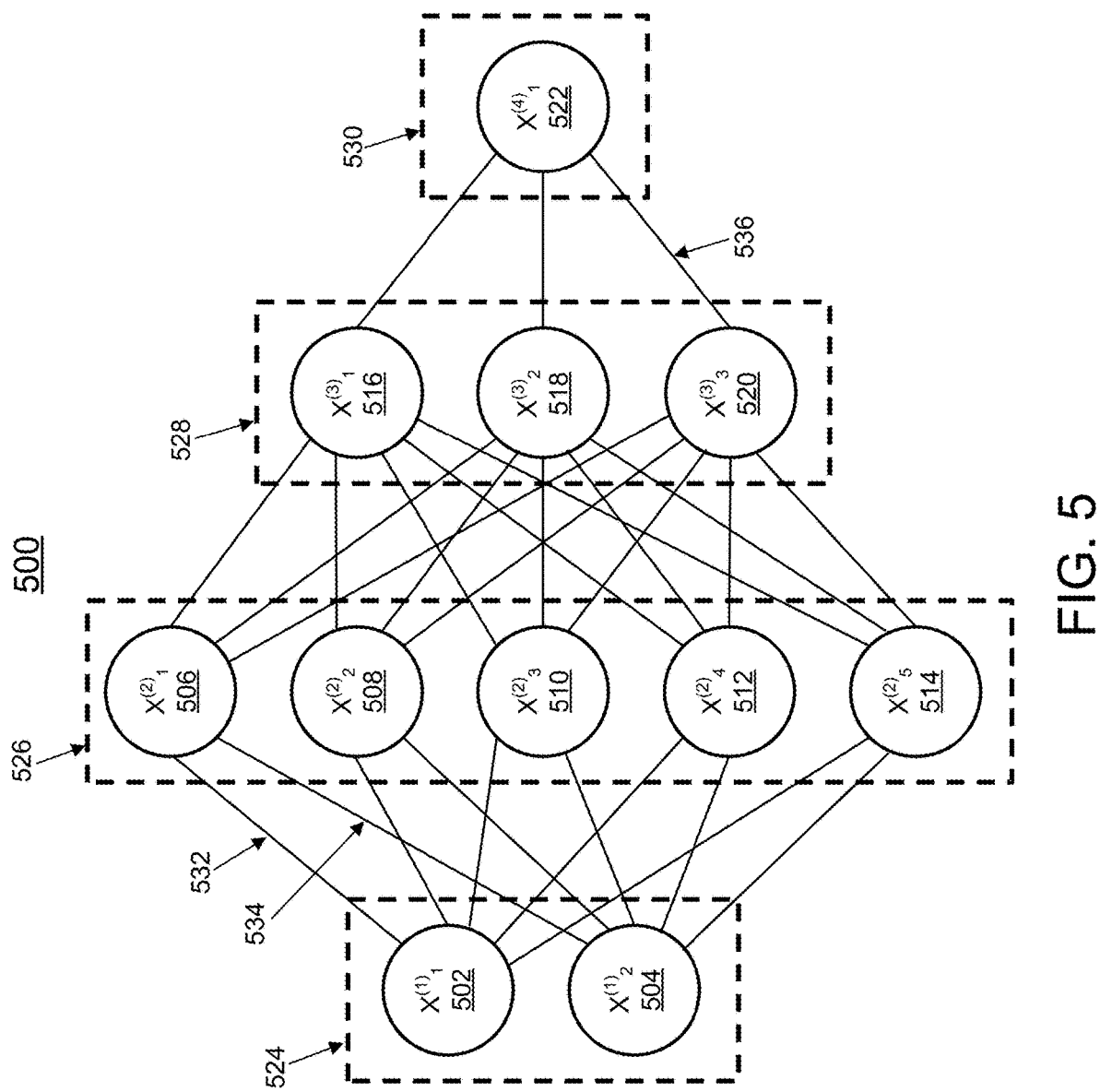
FIG. 5 shows an exemplary artificial neural network that may be used to implement one or more embodiments.

FIG. 5 shows an embodiment of an artificial neural network 500, in accordance with one or more embodiments. Alternative terms for "artificial neural network" are "neural network", "artificial neural net" or "neural net". Machine learning networks described herein, such as, e.g., the machine learning based model utilized at step 104 and a machine learning based model utilized at step 106 of FIG. 1 and DNN 204 of FIG. 2, may be implemented using artificial neural network 500.

The artificial neural network 500 comprises nodes 502-522 and edges 532, 534, . . . , 536, wherein each edge 532, 534, . . . , 536 is a directed connection from a first node 502-522 to a second node 502-522. In general, the first node 502-522 and the second node 502-522 are different nodes 502-522, it is also possible that the first node 502-522 and the second node 502-522 are identical. For example, in FIG. 5, the edge 532 is a directed connection from the node 502 to the node 506, and the edge 534 is a directed connection from the node 504 to the node 506. An edge 532, 534, . . . , 536 from a first node 502-522 to a second node 502-522 is also denoted as "ingoing edge" for the second node 502-522 and as "outgoing edge" for the first node 502-522.

In this embodiment, the nodes 502-522 of the artificial neural network 500 can be arranged in layers 524-530, wherein the layers can comprise an intrinsic order introduced by the edges 532, 534, . . . , 536 between the nodes 502-522. In particular, edges 532, 534, . . . , 536 can exist only between neighboring layers of nodes. In the embodiment shown in FIG. 5, there is an input layer 524 comprising only nodes 502 and 504 without an incoming edge, an output layer 530 comprising only node 522 without outgoing edges, and hidden layers 526, 528 in-between the input layer 524 and the output layer 530. In general, the number of hidden layers 526, 528 can be chosen arbitrarily. The number of nodes 502 and 504 within the input layer 524 usually relates to the number of input values of the neural network 500, and the number of nodes 522 within the output layer 530 usually relates to the number of output values of the neural network 500.

In particular, a (real) number can be assigned as a value to every node 502-522 of the neural network 500. Here, $x^{(n)}_i$ denotes the value of the i-th node 502-522 of the n-th layer 524-530. The values of the nodes 502-522 of the input layer 524 are equivalent to the input values of the neural network 500, the value of the node 522 of the output layer 530 is equivalent to the output value of the neural network 500. Furthermore, each edge 532, 534, . . . , 536 can comprise a weight being a real number, in particular, the weight is a real number within the interval $[-1, 1]$ or within the interval $[0, 1]$. Here, $w^{(m,n)}_{i,j}$ denotes the weight of the edge between the i-th node 502-522 of the m-th layer 524-530 and the j-th node 502-522 of the n-th layer 524-530. Furthermore, the abbreviation $w^{(n)}_{i,j}$ is defined for the weight $w^{(n,n+1)}_{i,j}$.

In particular, to calculate the output values of the neural network 500, the input values are propagated through the neural network. In particular, the values of the nodes 502-522 of the (n+1)-th layer 524-530 can be calculated based on the values of the nodes 502-522 of the n-th layer 524-530 by $$x^{(n+1)}_j = f\left(\sum_i x^{(n)}_i \cdot w^{(n)}_{i,j}\right).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 524 are given by the input of the neural network 500, wherein values of the first hidden layer 526 can be calculated based on the values of the input layer 524 of the neural network, wherein values of the second hidden layer 528 can be calculated based in the values of the first hidden layer 526, etc.

In order to set the values $w^{(m,n)}_{i,j}$ for the edges, the neural network 500 has to be trained using training data. In particular, training data comprises training input data and training output data (denoted as ti). For a training step, the neural network 500 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 500 (backpropagation algorithm). In particular, the weights are changed according to $$w_{i,j}^{T(n)} = w_{i,j}^{(n)} - \gamma \cdot \delta_j^{(n)} \cdot x_i^{(n)}$$

wherein $\gamma$ is a learning rate, and the numbers $\delta^{(n)}_j$ can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta^{(n+1)}_j$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 530, wherein f' is the first derivative of the activation function, and $y^{(n+1)}_j$ is the comparison training value for the j-th node of the output layer 530.

Figure 6:
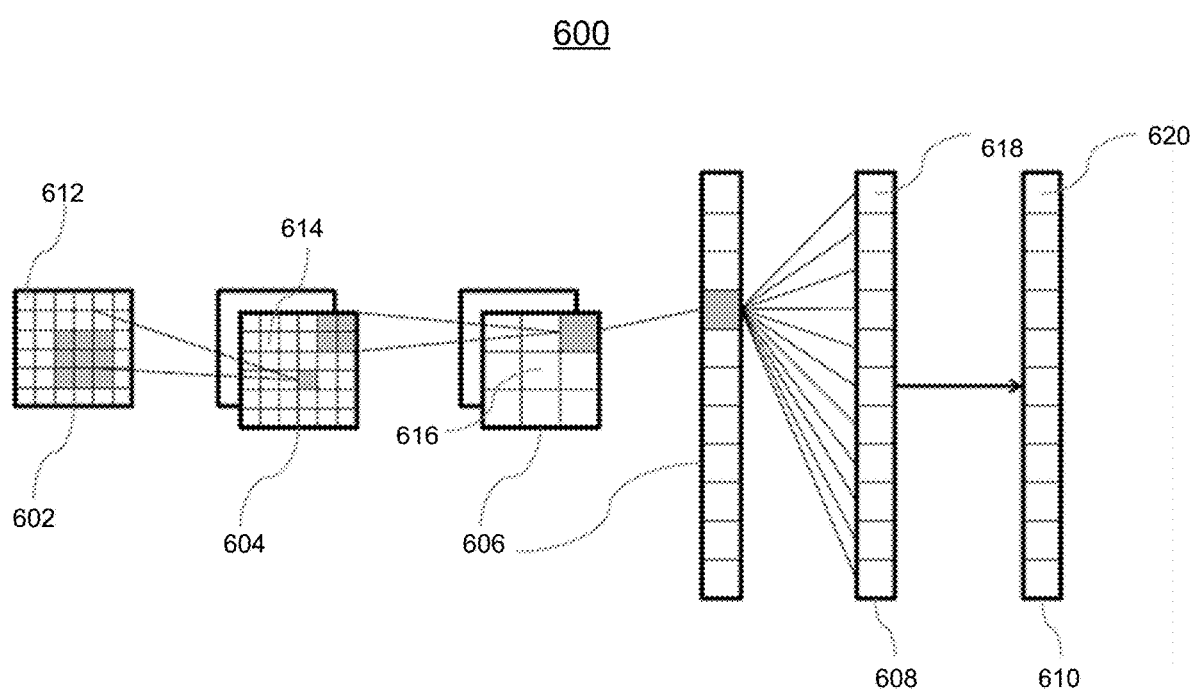
FIG. 6 shows a convolutional neural network that may be used to implement one or more embodiments.

FIG. 6 shows a convolutional neural network 600, in accordance with one or more embodiments. Machine learning networks described herein, such as, e.g., the machine learning based model utilized at step 104 and a machine learning based model utilized at step 106 of FIG. 1 and DNN 204 of FIG. 2, may be implemented using convolutional neural network 600.

In the embodiment shown in FIG. 6, the convolutional neural network comprises 600 an input layer 602, a convolutional layer 604, a pooling layer 606, a fully connected layer 608, and an output layer 610. Alternatively, the convolutional neural network 600 can comprise several convolutional layers 604, several pooling layers 606, and several fully connected layers 608, as well as other types of layers. The order of the layers can be chosen arbitrarily, usually fully connected layers 608 are used as the last layers before the output layer 610.

In particular, within a convolutional neural network 600, the nodes 612-620 of one layer 602-610 can be considered to be arranged as a d-dimensional matrix or as a d-dimensional image. In particular, in the two-dimensional case the value of the node 612-620 indexed with i and j in the n-th layer 602-610 can be denoted as $x^{(n)}_{[i,j]}$. However, the arrangement of the nodes 612-620 of one layer 602-610 does not have an effect on the calculations executed within the convolutional neural network 600 as such, since these are given solely by the structure and the weights of the edges.

In particular, a convolutional layer 604 is characterized by the structure and the weights of the incoming edges forming a convolution operation based on a certain number of kernels. In particular, the structure and the weights of the incoming edges are chosen such that the values $x^{(n)}_k$ of the nodes 614 of the convolutional layer 604 are calculated as a convolution $x^{(n)}_k = K_k * x^{(n-1)}$ based on the values $x^{(n-1)}$ of the nodes 612 of the preceding layer 602, where the convolution * is defined in the two-dimensional case as $$x_k^{(n)}[i,j] = (K_k * x^{(n-1)})[i,j] = \sum_{i'}\sum_{j'} K_k[i',j'] \cdot x^{(n-1)}[i-i', j-j'].$$

Here the k-th kernel $K_k$ is a d-dimensional matrix (in this embodiment a two-dimensional matrix), which is usually small compared to the number of nodes 612-618 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 612-620 in the respective layer 602-610. In particular, for a convolutional layer 604, the number of nodes 614 in the convolutional layer is equivalent to the number of nodes 612 in the preceding layer 602 multiplied with the number of kernels.

If the nodes 612 of the preceding layer 602 are arranged as a d-dimensional matrix, using a plurality of kernels can be interpreted as adding a further dimension (denoted as "depth" dimension), so that the nodes 614 of the convolutional layer 604 are arranged as a (d+1)-dimensional matrix. If the nodes 612 of the preceding layer 602 are already arranged as a (d+1)-dimensional matrix comprising a depth dimension, using a plurality of kernels can be interpreted as expanding along the depth dimension, so that the nodes 614 of the convolutional layer 604 are arranged also as a (d+1)-dimensional matrix, wherein the size of the (d+1)-dimensional matrix with respect to the depth dimension is by a factor of the number of kernels larger than in the preceding layer 602.

The advantage of using convolutional layers 604 is that spatially local correlation of the input data can exploited by enforcing a local connectivity pattern between nodes of adjacent layers, in particular by each node being connected to only a small region of the nodes of the preceding layer.

In embodiment shown in FIG. 6, the input layer 602 comprises 36 nodes 612, arranged as a two-dimensional 6×6 matrix. The convolutional layer 604 comprises 72 nodes 614, arranged as two two-dimensional 6×6 matrices, each of the two matrices being the result of a convolution of the values of the input layer with a kernel. Equivalently, the nodes 614 of the convolutional layer 604 can be interpreted as arranges as a three-dimensional 6×6×2 matrix, wherein the last dimension is the depth dimension.

A pooling layer 606 can be characterized by the structure and the weights of the incoming edges and the activation function of its nodes 616 forming a pooling operation based on a non-linear pooling function f. For example, in the two dimensional case the values $x^{(n)}$ of the nodes 616 of the pooling layer 606 can be calculated based on the values $x^{(n-1)}$ of the nodes 614 of the preceding layer 604 as $$x^{(n)}[i,j] = f(x^{(n-1)}[id_1, jd_2], \ldots, x^{(n-1)}[id_1 + d_1 - 1, jd_2 + d_2 - 1])$$

In other words, by using a pooling layer 606, the number of nodes 614, 616 can be reduced, by replacing a number d1·d2 of neighboring nodes 614 in the preceding layer 604 with a single node 616 being calculated as a function of the values of said number of neighboring nodes in the pooling layer. In particular, the pooling function f can be the max-function, the average or the L2-Norm. In particular, for a pooling layer 606 the weights of the incoming edges are fixed and are not modified by training.

The advantage of using a pooling layer 606 is that the number of nodes 614, 616 and the number of parameters is reduced. This leads to the amount of computation in the network being reduced and to a control of overfitting.

In the embodiment shown in FIG. 6, the pooling layer 606 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 608 can be characterized by the fact that a majority, in particular, all edges between nodes 616 of the previous layer 606 and the nodes 618 of the fully-connected layer 608 are present, and wherein the weight of each of the edges can be adjusted individually.

In this embodiment, the nodes 616 of the preceding layer 606 of the fully-connected layer 608 are displayed both as two-dimensional matrices, and additionally as non-related nodes (indicated as a line of nodes, wherein the number of nodes was reduced for a better presentability). In this embodiment, the number of nodes 618 in the fully connected layer 608 is equal to the number of nodes 616 in the preceding layer 606. Alternatively, the number of nodes 616, 618 can differ.

Furthermore, in this embodiment, the values of the nodes 620 of the output layer 610 are determined by applying the Softmax function onto the values of the nodes 618 of the preceding layer 608. By applying the Softmax function, the sum the values of all nodes 620 of the output layer 610 is 1, and all values of all nodes 620 of the output layer are real numbers between 0 and 1.

A convolutional neural network 600 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 600 can be trained based on the backpropagation algorithm. For preventing overfitting, methods of regularization can be used, e.g. dropout of nodes 612-620, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1-4. Certain steps or functions of the methods and workflows described herein, including one or more of the steps or functions of FIGS. 1-4, may be performed by a server or by another processor in a network-based cloud-computing system. Certain steps or functions of the methods and workflows described herein, including one or more of the steps of FIGS. 1-4, may be performed by a client computer in a network-based cloud computing system. The steps or functions of the methods and workflows described herein, including one or more of the steps of FIGS. 1-4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 1-4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
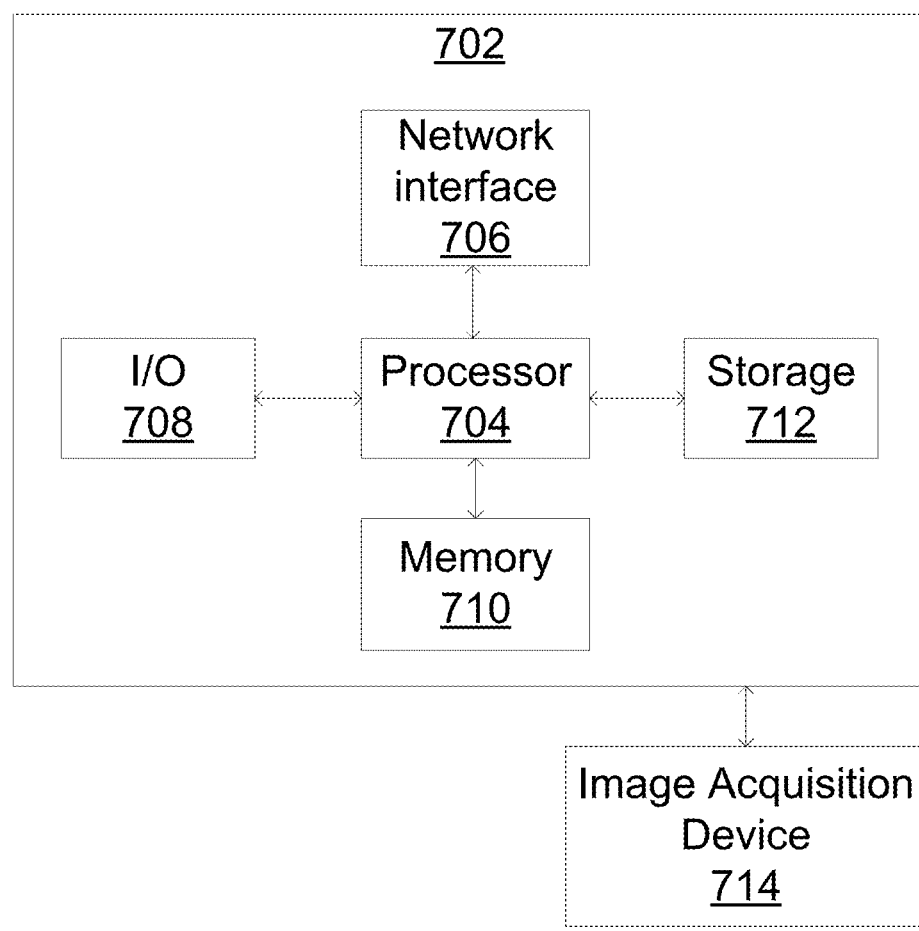
FIG. 7 shows a high-level block diagram of a computer that may be used to implement one or more embodiments.

A high-level block diagram of an example computer 702 that may be used to implement systems, apparatus, and methods described herein is depicted in FIG. 7. Computer 702 includes a processor 704 operatively coupled to a data storage device 712 and a memory 710. Processor 704 controls the overall operation of computer 702 by executing computer program instructions that define such operations. The computer program instructions may be stored in data storage device 712, or other computer readable medium, and loaded into memory 710 when execution of the computer program instructions is desired. Thus, the method and workflow steps or functions of FIGS. 1-4 can be defined by the computer program instructions stored in memory 710 and/or data storage device 712 and controlled by processor 704 executing the computer program instructions. For example, the computer program instructions can be implemented as computer executable code programmed by one skilled in the art to perform the method and workflow steps or functions of FIGS. 1-4. Accordingly, by executing the computer program instructions, the processor 704 executes the method and workflow steps or functions of FIGS. 1-4. Computer 702 may also include one or more network interfaces 706 for communicating with other devices via a network. Computer 702 may also include one or more input/output devices 708 that enable user interaction with computer 702 (e.g., display, keyboard, mouse, speakers, buttons, etc.).

Processor 704 may include both general and special purpose microprocessors, and may be the sole processor or one of multiple processors of computer 702. Processor 704 may include one or more central processing units (CPUs), for example. Processor 704, data storage device 712, and/or memory 710 may include, be supplemented by, or incorporated in, one or more application-specific integrated circuits (ASICs) and/or one or more field programmable gate arrays (FPGAs).

Data storage device 712 and memory 710 each include a tangible non-transitory computer readable storage medium. Data storage device 712, and memory 710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 708 may include peripherals, such as a printer, scanner, display screen, etc. For example, input/output devices 708 may include a display device such as a cathode ray tube (CRT) or liquid crystal display (LCD) monitor for displaying information to the user, a keyboard, and a pointing device such as a mouse or a trackball by which the user can provide input to computer 702.

An image acquisition device 714 can be connected to the computer 702 to input image data (e.g., medical images) to the computer 702. It is possible to implement the image acquisition device 714 and the computer 702 as one device. It is also possible that the image acquisition device 714 and the computer 702 communicate wirelessly through a network. In a possible embodiment, the computer 702 can be located remotely with respect to the image acquisition device 714.

Any or all of the systems and apparatus discussed herein may be implemented using one or more computers such as computer 702.

One skilled in the art will recognize that an implementation of an actual computer or computer system may have other structures and may contain other components as well, and that FIG. 7 is a high level representation of some of the components of such a computer for illustrative purposes.

Independent of the grammatical term usage, individuals with male, female or other gender identities are included within the term.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
receiving an input medical image of an anatomical landmark of a patient;
generating one or more probability maps predicting a first point and a second point of the anatomical landmark in the input medical image using a machine learning based model;
determining locations of the first point and the second point in the input medical image based on the one or more probability maps; and
outputting the locations of the first point and the second point in the input medical image,
wherein the machine learning based model is trained based on a training data set comprising ground-truth locations of first points and second points in training images.

2. The computer-implemented method of claim 1, further comprising:
calculating a distance between the first point and the second point based on the locations.

3. The computer-implemented method of claim 1, wherein determining locations of the first point and the second point in the input medical image based on the one or more probability maps comprises:
determining the locations of the first point and the second point in the input medical image using a DSNT (differentiable spatial to numerical transform) layer.

4. The computer-implemented method of claim 3, wherein determining the locations of the first point and the second point in the input medical image using a DSNT (differentiable spatial to numerical transform) layer comprises:
determining the locations of the first point and the second point in the input medical image using the DSNT layer based on a size of the input medical image.

5. The computer-implemented method of claim 3, wherein the machine learning based model and the DSNT layer are jointly trained based on the training data set, the training data set further comprising ground-truth probability maps of the first points and the second points in the training images and ground-truth vectors pointing from the first points and the second points in the training images.

6. The computer-implemented method of claim 1, wherein determining locations of the first point and the second point in the input medical image based on the one or more probability maps comprises:

determining 3D (three-dimensional) coordinates of the first point and the second point in the input medical image.

7. The computer-implemented method of claim 1, wherein the machine learning based model is an image-to-image based deep neural network.

8. The computer-implemented method of claim 1, wherein the anatomical landmark is a tear in a muscle or tendon of the patient and the first point and the second point are end points of the tear.

9. The computer-implemented method of claim 8, wherein the tear in the muscle or tendon of the patient is a tear in a rotator cuff of the patient.

10. An apparatus comprising:
    means for receiving an input medical image of an anatomical landmark of a patient;
    means for generating one or more probability maps predicting a first point and a second point of the anatomical landmark in the input medical image using a machine learning based model;
    means for determining locations of the first point and the second point in the input medical image based on the one or more probability maps; and
    means for outputting the locations of the first point and the second point in the input medical image,
    wherein the machine learning based model is trained based on a training data set comprising ground-truth locations of first points and second points in training images.

11. The apparatus of claim 10, further comprising:
    means for calculating a distance between the first point and the second point based on the locations.

12. The apparatus of claim 10, wherein the means for determining locations of the first point and the second point in the input medical image based on the one or more probability maps comprises:
    means for determining the locations of the first point and the second point in the input medical image using a DSNT (differentiable spatial to numerical transform) layer.

13. The apparatus of claim 12, wherein the means for determining the locations of the first point and the second point in the input medical image using a DSNT (differentiable spatial to numerical transform) layer comprises:
    means for determining the locations of the first point and the second point in the input medical image using the DSNT layer based on a size of the input medical image.

14. The apparatus of claim 12, wherein the machine learning based model and the DSNT layer are jointly trained based on the training data set, the training data set further comprising ground-truth probability maps of the first points and the second points in the training images and ground-truth vectors pointing from the first points and the second points in the training images.

15. A non-transitory computer readable medium storing computer program instructions, the computer program instructions when executed by a processor cause the processor to perform operations comprising:
    receiving an input medical image of an anatomical landmark of a patient;
    generating one or more probability maps predicting a first point and a second point of the anatomical landmark in the input medical image using a machine learning based model;
    determining locations of the first point and the second point in the input medical image based on the one or more probability maps; and
    outputting the locations of the first point and the second point in the input medical image,
    wherein the machine learning based model is trained based on a training data set comprising ground-truth locations of first points and second points in training images.

16. The non-transitory computer readable medium of claim 15, the operations further comprising:
    calculating a distance between the first point and the second point based on the locations.

17. The non-transitory computer readable medium of claim 15, wherein determining locations of the first point and the second point in the input medical image based on the one or more probability maps comprises:
    determining 3D (three-dimensional) coordinates of the first point and the second point in the input medical image.

18. The non-transitory computer readable medium of claim 15, wherein the machine learning based model is an image-to-image based deep neural network.

19. The non-transitory computer readable medium of claim 15, wherein the anatomical landmark is a tear in a muscle or tendon of the patient and the first point and the second point are end points of the tear.

20. The non-transitory computer readable medium of claim 19, wherein the tear in the muscle or tendon of the patient is a tear in a rotator cuff of the patient.

* * * * *